March 24, 1942.　　　L. N. MILLER　　　2,277,130
DIFFERENTIAL CONVERTIBLE GASOLINE-DIESEL ENGINE
Filed March 31, 1938　　　6 Sheets-Sheet 5
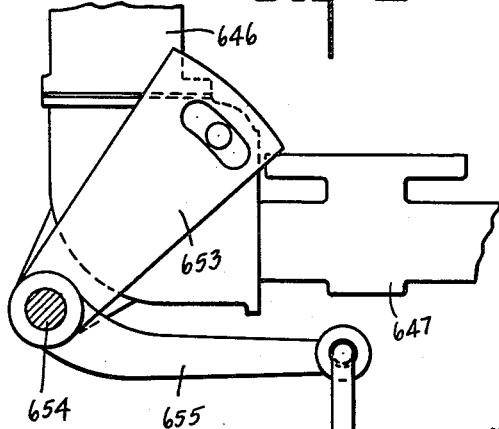
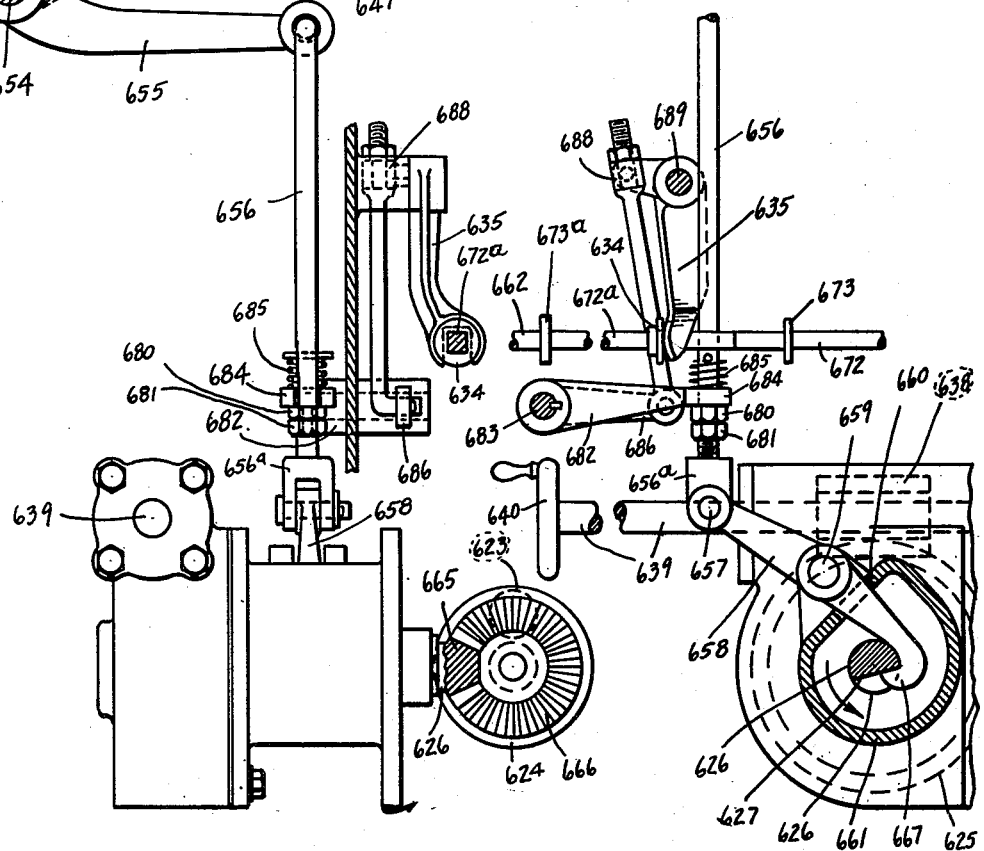
INVENTOR.
LAURITZ N. MILLER.
Lockwood Goldsmith + Galt
ATTORNEYS.

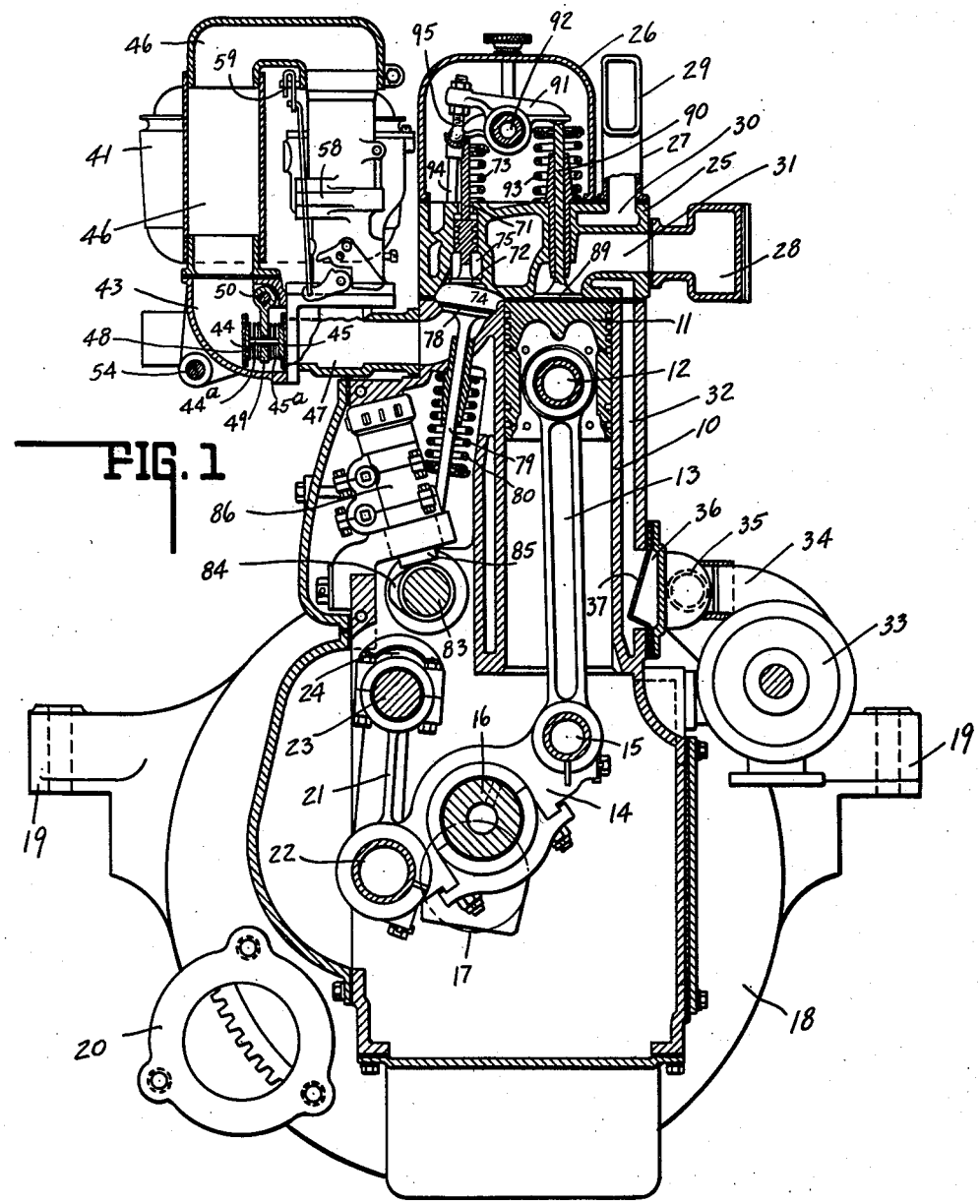

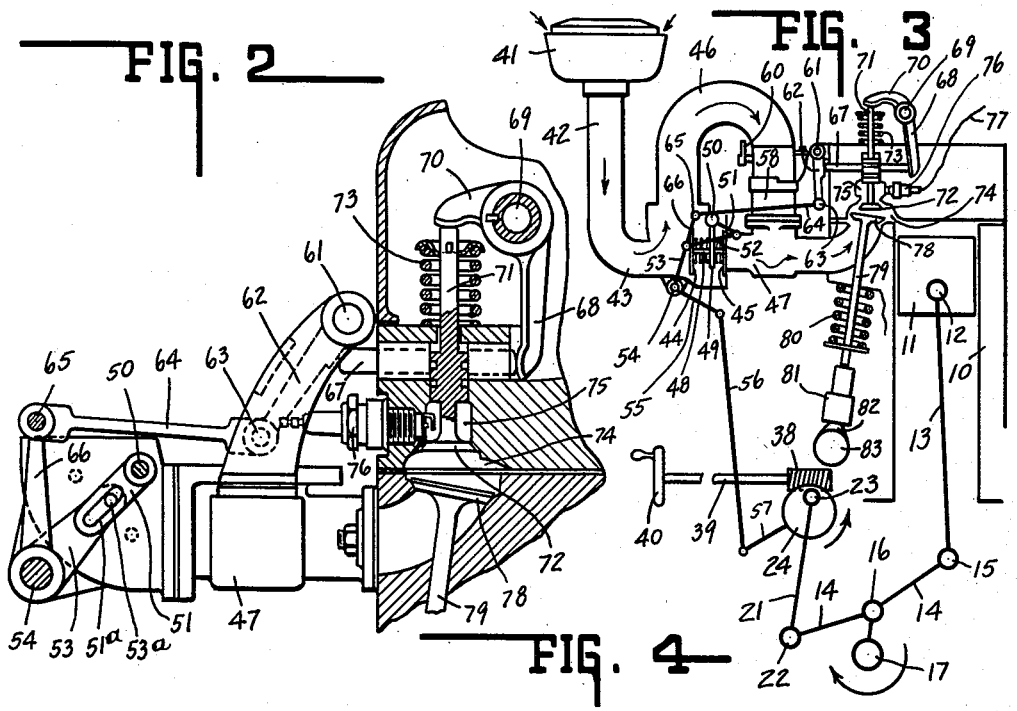

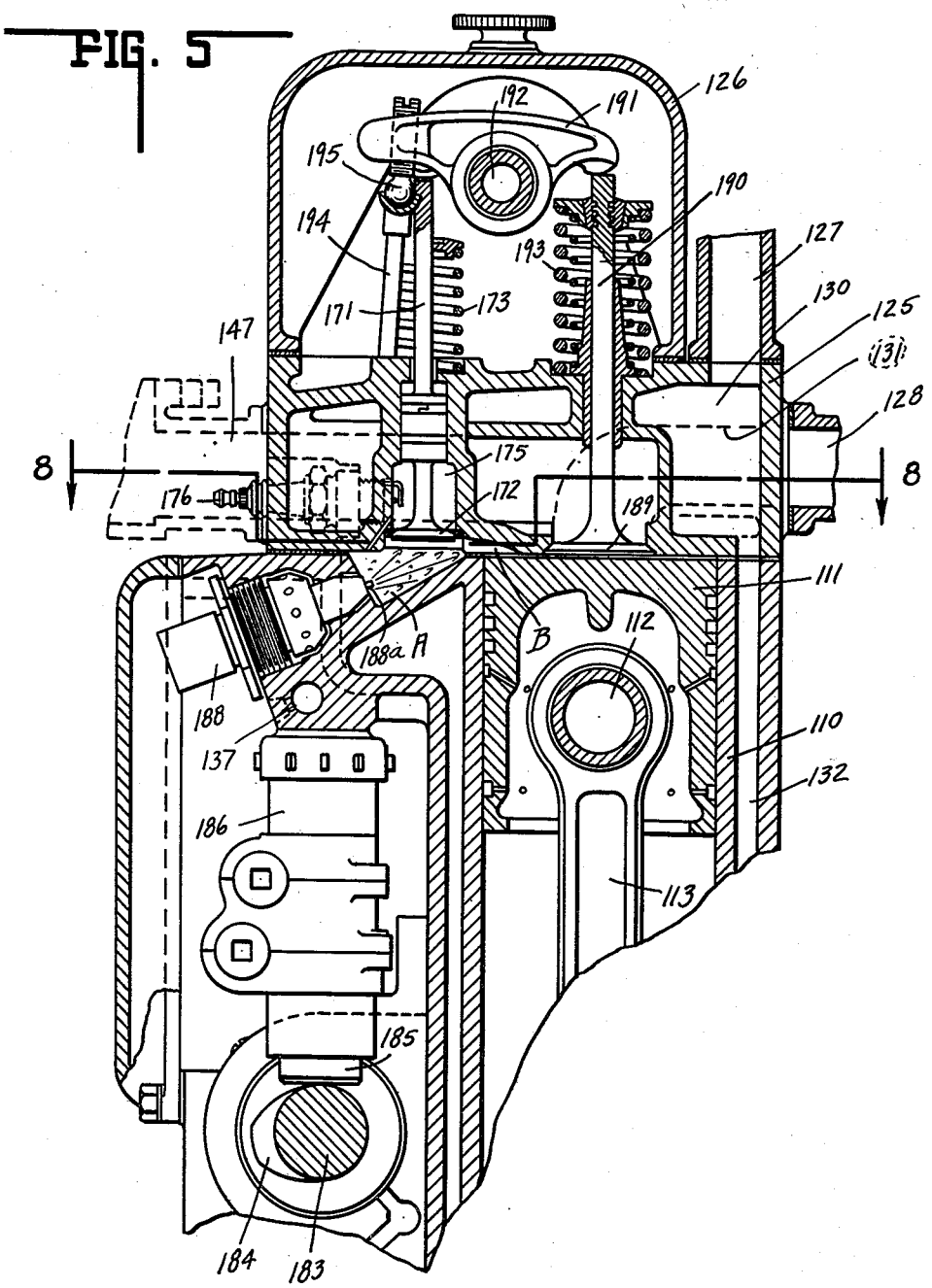

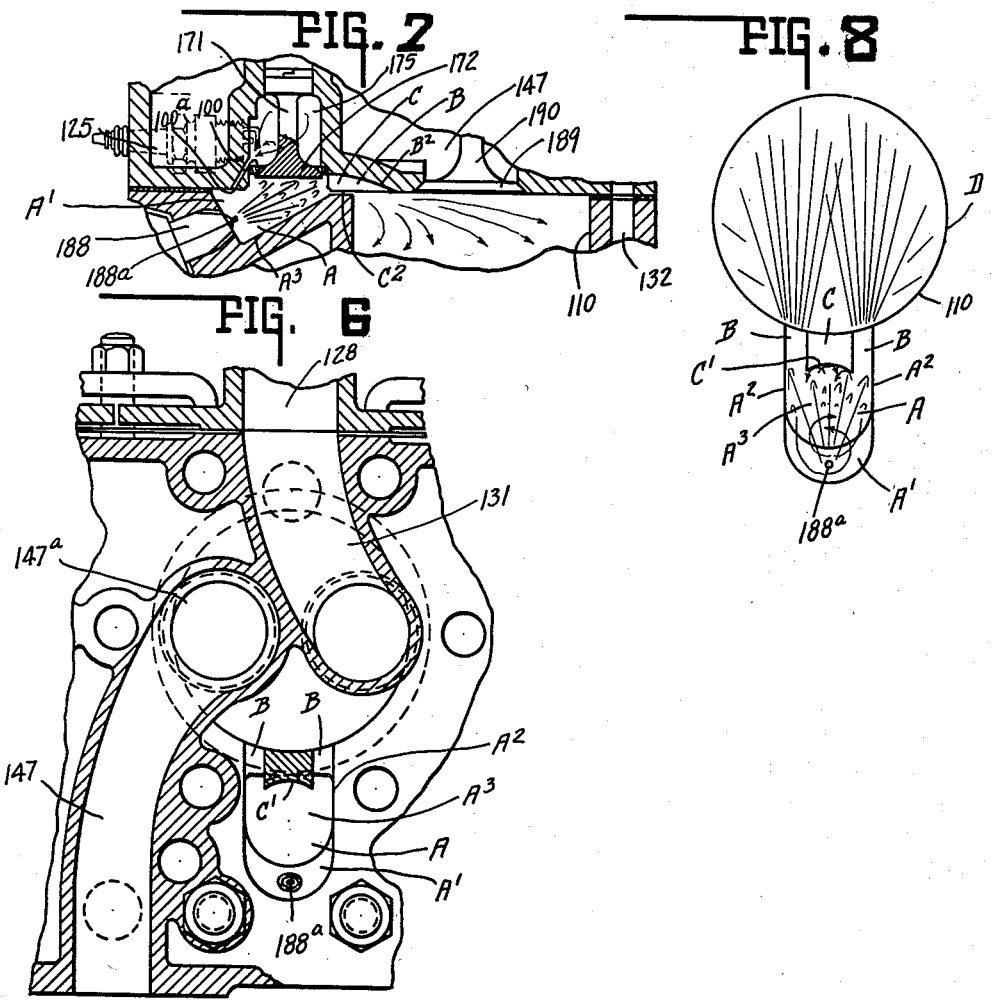

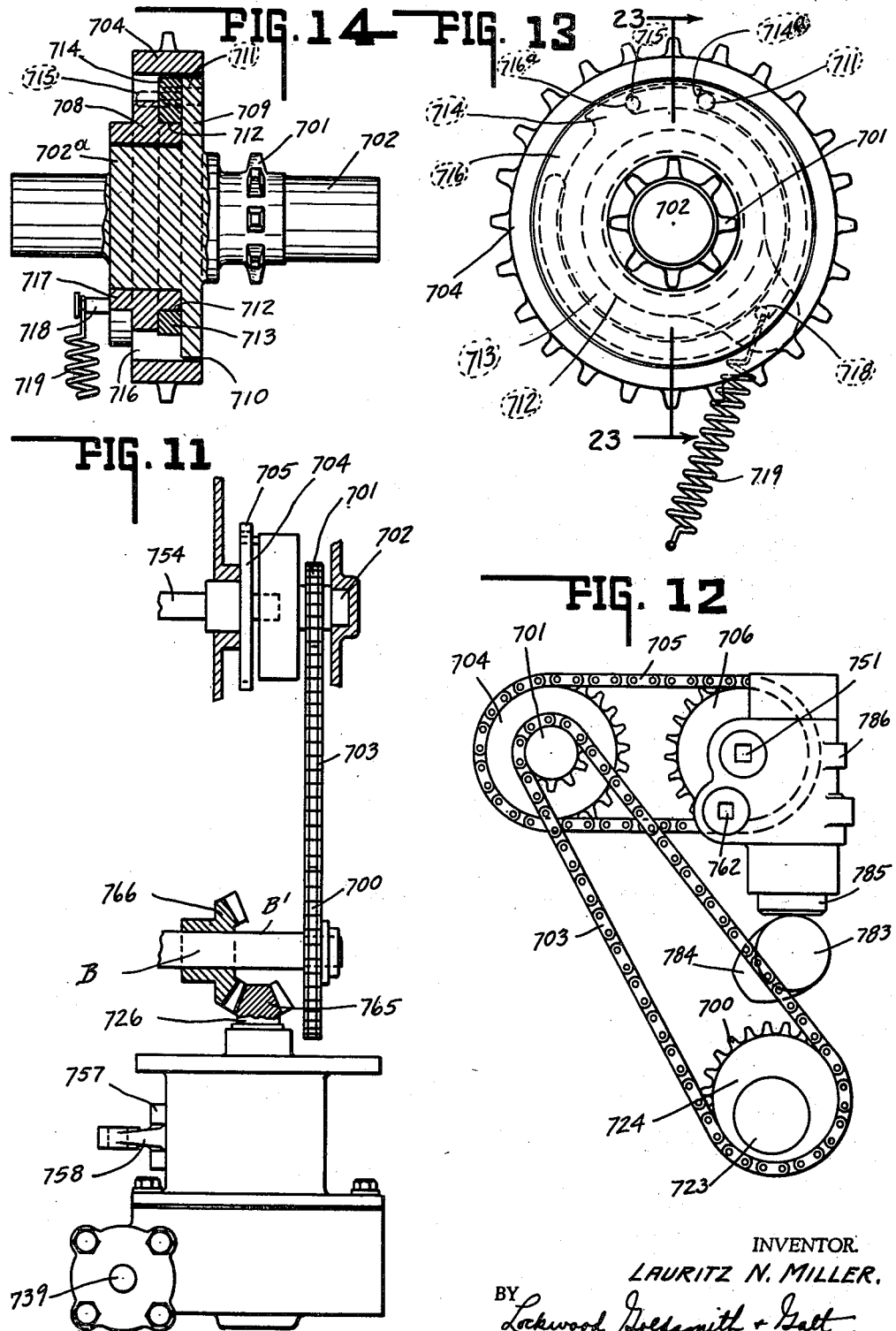

Patented Mar. 24, 1942

2,277,130

UNITED STATES PATENT OFFICE 2,277,130

DIFFERENTIAL CONVERTIBLE GASOLINE-DIESEL ENGINE

Lauritz N. Miller, Eugene, Oreg.

Application March 31, 1938, Serial No. 199,210

6 Claims. (Cl. 123—1)

This invention relates to internal combustion engines and of multi-cylinder character, if desired, and wherein the advantages of a gasoline engine and a Diesel engine are included without the inherent disadvantages incident to the operation of either. These two types of engines have certain recognized advantages well known in the industry. They likewise have certain recognized disadvantages.

The chief object of this invention is to produce an engine which will include a maximum number of advantages of both engines and a minimum number of the disadvantages thereof.

One object of the invention consists in its operation at a relatively low compression ratio as a gasoline engine and its operation under relatively high compression ratio as a Diesel engine.

One feature of the invention consists in providing mechanism whereby the gasoline engine range of compression may be varied and/or the Diesel engine range of compression may be varied.

Another feature of the invention consists in the means for transforming the engine from one of gasoline operating type to Diesel operating type.

Another feature of the invention consists in automatically reducing the zero volume of the engine when it is changed from a gasoline type engine to a Diesel type engine for operation.

Another object of the invention is to provide means for the engine when operating as a Diesel, to automatically control the fuel supply so as to prevent the engine from attaining excessive speeds and running away.

One feature of the invention for the accomplishment of the foregoing object, consists in arranging the mechanism incident to the engine operation so that all or a part of the fuel supplied when operating as a Diesel is bypassed.

Another feature of the invention consists in an improved form of combustion chamber.

One chief feature of the invention consists in the automatic and relatively quick change-over from a gasoline supply to the Diesel fuel supply simultaneously with the change in the compression ratio, before mentioned, and vice versa from gasoline to Diesel and vice versa.

Another feature of the invention consists in arranging the mechanism for changing over from one type of operation to the other, or vice versa, so that the change may be manually effected, thereby permitting the operator to continue operation under either gasoline or Diesel operation as long as desired, which may be due to certain critical operations, to-wit, failure of the engine in its fuel supply, for example, under one phase of operation.

Another feature of the invention consists in providing means whereby when the compression ratio changes while operating as a Diesel and such change constitutes an excessive reduction, the time of fuel injection is automatically retarded.

Another feature of the invention consists in the improved fuel supply for Diesel operation.

Another feature of the invention consists in providing manually operable means which is arranged so that the time of fuel injection when operating as a Diesel can be varied, depending upon operating conditions so that the most effective time of application can be utilized with reference to the operation of the Diesel at that time. Such adjustment is highly desirable because the character of fuels vary and furthermore, the altitude in which the engine is operating is critical with reference to the absolute compression ratio. When the engine is used for automotive purposes, it will be recognized that the engine may move rapidly from one elevation to a very materially different elevation and, therefore, the aforesaid is highly critical and desirable.

Furthermore, when the engine is used for automotive purposes and operates as a Diesel, it has a characteristic which permits it to operate as a brake which while not impossible with standard Diesel engines used for automotive purposes, nevertheless eliminates absolutely the possibility of destruction or damage to the injection system which is an essential inherent characteristic of such Diesel engines when so operated as a brake.

The full nature of the invention will be understood from the accompanying drawings and the following description and claims:

In the drawings,

Fig. 1 is a vertical sectional view through a combination gasoline-Diesel engine embodying the invention.

Fig. 2 is a similar view of the upper and valve portion on a slightly larger scale.

Fig. 3 is a semi-diagrammatic view similar to Fig. 1, and illustrating the parts in the gasoline operating position.

Fig. 4 is a view similar to Fig. 3 but illustrates the parts in the Diesel operating position.

Fig. 5 is a view similar to Fig. 1 but enlarged and of the upper portion thereof, and of a modified form of the invention.

Fig. 6 is a transverse sectional view of the intake, exhaust and fuel passages, and is taken approximately in the plane of the line 8—8 of Fig. 5 and in the direction of the arrows.

Fig. 7 is an enlarged vertical sectional view taken in a central plane to illustrate the injector scavenging and cleaning mechanism and is of the form of the invention shown in Figs. 5 and 8.

Fig. 8 is a diagrammatic plan view of the combustion chamber and corresponds to a section parallel to that shown in Fig. 6 but closer to the cylinder bore.

Fig. 9 is an elevational view of a portion of the mechanism and part of the control associated with parts whereby when the engine operates as a gasoline engine, the control is arranged to effect a bypassing of the Diesel engine fuel supply within the injector.

Fig. 10 is a side elevation thereof, parts being broken away and shown in section to illustrate the same and other parts in greater detail.

Fig. 11 is an elevational view of mechanism for retarding the time of injection of the Diesel operating fuel when the engine operates under low compression as a Diesel or when the engine operates as a gasoline engine and the automatic action upon gasoline to Diesel transformation.

Fig. 12 is an elevational view of a portion of the parts shown in Fig. 11 and is taken at right angles thereto.

Fig. 13 is an enlarged side elevational view of the lost motion connection embodied in the disclosure illustrated in Figs. 11 and 12.

Fig. 14 is a sectional view taken on line 23—23 of Fig. 13 and in the direction of the arrows.

In Figs. 1, 3 and 4 of the drawings, 10 indicates a conventional cylinder structure of an engine embodying the invention. Mounted therein for reciprocation is a piston structure indicated by the numeral 11, and of any desired character. The piston is connected by a wristpin 12 to a connecting rod 13, in turn connected to a rocker arm 14 by being pivoted thereto as at 15 at one end of the arm. The rocker arm is pivotally mounted upon the throw or eccentric portion 16 of the crankshaft indicated by the numeral 17 in Fig. 1, and represented by the dot and dash line. The crankshaft is suitably supported in bearings of any desired character and number, carried by or formed in the crankcase 18, the latter being provided with mounting brackets or arms 19 for mounting in a frame or a vehicle chassis, depending on whether the device is intended for stationary or vehicle use.

In Fig. 1 there is illustrated in elevation a conventional representation of a starting motor 20, the same being connected to the flywheel starting gear which may be of conventional character, as is well known in the automotive engineering practice.

The other end of the rocker arm 14 is pivotally connected to the lower end of the pendulum like member 21 as at 22. The upper end thereof is suitably mounted upon and pivotally supported by the eccentric portion 23 of a rotatable member 24, shown more diametrically and clearly in Figs. 3 and 4.

The engine includes the cylinder head structure, indicated generally in Fig. 1 by 25. This in turn supports a suitable cap structure 26. To the head structure may be suitably secured an exhaust manifold 28. Structure 27 is a water manifold and includes the discharge conduit 29. It will be noted the water cooling passage 30 in the head encircles the exhaust passage 31 from the cylinder and in the head. The cylinder block is provided with head communicating water cooling passages 32. 33 in Fig. 1 indicates a water pump discharging as at 34 to a conduit 35 lying parallel to all of the cylinders and feeding into the same as shown as at 36. So as to secure the desired uniformity of distribution to the respective water passages in the cylinder blocks, the plate 37 constitutes a distributing plate in each intake passage with reference to the water cooling arrangement.

As shown clearly in Figs. 3 and 4, the member 24 is rotated by means of a worm 38 meshing with worm wheel, not shown, but concentric with the member 24. Worm 38 is carried by shaft 39 which is extended to the dash compartment of the vehicle, and mounts a handwheel 40 thereon. This provides a manual control for shifting the position of the eccentric 23 from that illustrated in Fig. 3, for example, to that illustrated in Fig. 4.

Fig. 3 represents the position of the eccentric 24 and other parts hereinafter to be mentioned when the engine is operating as a gasoline engine.

Fig. 4 represents the position of the same parts when operating as a Diesel engine.

The numeral 41 indicates an air cleaner—see Figs. 3 and 4—supplying clean air to the conduit 42. Conduit 42 discharges to a chamber 43 in which is mounted a valve structure of dual character having one valve member 44 and another valve member 45. Valve member 44 is arranged to control the intake to the passage 46. Valve member 45 is arranged to control the intake to the passage 47.

Valve member 44—45 includes the portion 48 which is associated with the arm 49 pivoted as at 50. The rock shaft 50 supports an arm 51 by which it is actuated from one position into the other position and vice versa, as illustrated in Figs. 3 and 4. This arm 51 is connected by a link 52 to one arm 53 of a bell crank lever pivoted at 54, the other arm 55 of which is connected by a link 56 to an arm 57 connected to the member 24 so that it rocks or oscillates with the member 24 as the eccentric portion 23 is shifted from one position to another. Thus, the air supply is varied from that shown in Fig. 3 to that shown in Fig. 4 simultaneously with the change over variation in the compression ratio variations, as hereinafter pointed out.

Valve movement is relatively quick at the time the rod connected to the arm is actuated. As previously stated and as hereinafter detailed, rod movement occurs a predetermined point of compression ratio change.

By referring to Fig. 2 it will be noted that the link 51 is slotted as at 51a and the arm 53 includes a pin 53a which is mounted in the elongated slot 51a and thus the desired action may be obtained so that the valve 44—45 may be selectively positioned, as previously described, and if, as and when necessary, the rock shaft 54 may be further actuated for other purposes without carrying forward the actuation of the valves beyond that desired for seating in the selected position.

Between the passage 46 and the passage 47 behind the seat closed by the valve 45, is a carburetor 58. In Fig. 1, the numeral 59 indicates the member of the carburetor, which is responsive to manual control by means of a foot throttle, or the like, as is conventional practice. In Figs. 3 and 4, 60 indicates another control member for the fuel supply. The aforesaid parts 58—59—60 are conventional carburetor controls.

Pivotally supported to one side of the head as at 61 is a lever member 62 pivotally connected at 63 to one end of a link 64, the other end being connected as at 65 to an arm 66, the latter being an extension of the arm 53 of the bell crank lever. Slidably supported adjacent the mounting 61 is the member 67 that at one end engages the member 62 and at the opposite end engages one end of the member 68 pivotally supported at 69 and having an arm portion 70 that engages the top of the stem 71 of a valve member having a valve 72. A spring 73 normally constrains the valve and stem upwardly into closed position the same being illustrated in Fig. 4. When the manually operable mechanism has been actuated to that degree necessary to effect the change in the operation of the engine from a Diesel to that of gasoline character, the aforesaid mechanism, to-wit, 66, 64, 62, 67, 68 and 70 conditions the valve so that it is normally retained in the open valve position, as shown in Fig. 3.

The valve 72 controls the communication between the zero volume chamber 74 and the chamber 75 with which a spark plug 76 is associated, the latter being supplied with energy as at 77. The purpose of this auxiliary chamber 75 is multi-fold. One conventional purpose is to insure ignition of the gaseous mixture when the engine is operating as a gasoline engine and, therefore, since it confines the ignition initially to the gaseous mixture trapped in this chamber 75, the problem of knocking of the engine is materially reduced. Therefore, this engine can operate on a very low grade so-called gasoline.

Positioned in the zero volume combustion chamber 74 is a valve 78 supported by stem 79. This constitutes the intake valve of the engine when it operates as a gasoline engine. It is normally constrained toward seated position by the spring 80 and the tappet 81 is actuated by the cam portion 82 of the cam shaft 83 in the conventional manner.

It will be noted the spark plug 76 in Fig. 2 has a diametrical positioning with respect to the spark plug 76 shown in Fig. 3. Either position may be utilized, depending upon which is less objectionable.

When the engine is operating as a Diesel—see Fig. 4, the cam shaft 83 having the cam 84 thereon is adapted to engage the plunger 85 of an injector structure 86 discharging as at 68 to—see Figs. 1 and 4—the cylinder 10.

The exhaust valve—see Fig. 1—is indicated by the numeral 89 and the stem 90 thereof is engaged by the rocker arm 91 pivotally supported at 92 and is normally constrained by spring 93 into closed position. The rocker arm 91 is actuated by the rod 94 through the adjustable connection 95, as shown at the top portion of Fig. 1, and the same is actuated by the cam shaft 83.

In Fig. 1 the showing of the spark plug is omitted for clearness. It is, however, shown in Fig. 2. It is omitted for a like reason in Fig. 4. Likewise the exhaust valve is omitted in Figs. 2 to 4, inclusive. From the foregoing, therefore, the operation of the engine as a gasoline engine will be obvious.

In Fig. 5, a somewhat modified form of the invention is illustrated. This form of the invention chiefly differs from that illustrated in Figs. 1 to 4, inclusive, in that the injector mechanism is differently positioned and discharges into the zero volume chamber in a different location. Numerals of the 100 series indicate like or similar parts.

The zero volume chamber in Fig. 5 is designated by letters A and B, and also includes under certain circumstances the auxiliary or preliminary ignition chamber 175. The nozzle 188 communicates with the injector 186 and herein both are illustrated as a combination unit. The injector mechanism has the plunger portion 185 actuated by cam 184 of the cam shaft 183. The piston 111 reciprocates in the cylinder 110, water jacketed as at 132, the latter communicating with the jacket portion 130 in the head structure 125, the head having exhaust passage 131 controlled by exhaust valve 189 and discharging to the exhaust manifold 128. The exhaust valve operating mechanism is substantially the same as that previously described.

The valve 172 controlling the auxiliary or initial ignition chamber 175 is carried by stem 171 of piston character and similarly actuated. The element 194 that actuates the rocker arm 191 mounted on shaft 192 and through the connection 195 is actuated by the cam shaft by conventional means customary in overhead valve engines. The spark plug 176 is herein illustrated as positioned so as to fire within the initial ignition chamber 175.

By referring to Fig. 6 it will be noted that air is supplied to the intake passage 147 and the port 147a is arranged for suitable intake valve control, the said intake valve being positioned in longitudinal alignment with the exhaust valve. Note in Fig. 1, the exhaust valve is designated by the numeral 89 and 189 in Fig. 5 designates the intake valve. The other numerals, to-wit, 190, 191, 193, 194 and 195 designate valve stem, spring, rocker arm and actuating mechanism identical to that previously described and bearing similar numerals of the primary series but referring to the exhaust valve and its actuating mechanism.

Attention is specifically directed to the chamber portion designated A in the middle of Fig. 5 as well as the chamber portion designated B therein and immediately to the right thereof. This chamber arrangement is similarly designated in Fig. 6 and further reference will be had thereto. It is to be understood that air or the fuel mixture when operating as a gas engine is supplied by the passage 147 to the cylinder and is compressed by the piston 111 and forced into the zero volume, to-wit, chamber portions A and B, as well as the auxiliary chamber 175.

At the proper interval if the engine be operating as a gasoline engine, the ignition is supplied to the spark plug 176 at 61 and while the engine is operating as a gasoline engine, the valve 172 remains in the lowered or open position. Thus the initial combustion of the combustible mixture occurs in this auxiliary chamber and gradually feeds out around the valve and spreads into chamber A and B and as the gases expand, the power piston 111 is moved and combustion becomes complete. This eliminates to a considerable degree the detonating effect obtained when utilizing relatively low octane gasoline type fuels.

When the device operates on a Diesel principle, the valve 172 remains closed during the entire period of operation.

Reference will now be had to Fig. 7 and this figure illustrates substantially that which is illustrated in Fig. 5 and, therefore, like numerals and letters employed in Fig. 5 are herein employed. This figure illustrates the addition of a relief port 100 providing restricted communication between the auxiliary chamber 175 and the chamber portion A. When the device is operating on the Diesel principle, the air, supplied on the intake stroke through passes 147, the valve 189, being then open, thereafter is compressed, the valve 189 being then closed and the piston returning on the compression stroke, is forced into the chamber portions B and A and through the restricted passage 100 into the chamber 175.

Reference is now had to Figs. 3 and 4, wherein there is illustrated one specific example of the difference in the travel of the piston at its upper limit when the change is made from gasoline to Diesel operation. In other words, at this time the piston 111—see Fig. 5—is close to the valve 189 when the latter is seated and, therefore, the air supplied to the cylinder is under a relatively high compression and a portion thereof is stored in the chamber 175. At the proper interval through cam 184 the injector 186 is operated to supply fuel to the nozzle 188 and this nozzle through the tip 188a discharges the fuel into the chamber A, where it mixes with the highly compressed air and ignites due to the high compression. The fuel, of course, is supplied under the desired pressure as is well understood in Diesel practice. Upon ignition taking place, the air and fuel burn forming expanding gases which force the power piston downwardly, this being the power stroke. As the piston moves downwardly, the pressure is released. At the proper time, of course, the fuel discharge is discontinued. However, as the piston travels further and further on its power stroke, the highly compressed air in the auxiliary chamber 175 is discharged through the restricted passage 100 into chamber A and swirls about the discharged tip 188a and insures complete burning of the last drop of oil on that tip, thereby insuring the maintenance of a clean fuel nozzle at all times when the engine is operating on the Diesel principle.

The arrows in Fig. 7 do not show this last supplementary air discharge in the chamber A although the arrows in the chamber 175 do show that it is discharging. The fuel pressure naturally is higher than the air pressure. The fuel nozzle also is shown directed angularly with reference to the discharge end 100a of the discharge passage 100 so that the raw fuel is not discharged thereto so that accidental filling of this opening with fuel is prevented.

Reference will now be had to Fig. 10 wherein the same numerals employed in Figs. 5, 6 and 7 are again employed. This figure is a diagrammatic plan view taken approximately in the plane of the auxiliary chamber control valve and seat shown in Fig. 7. It is also shown in Fig. 6. As shown in these several figures and more especially Fig. 8, numeral 110 indicates the cylinder chamber. A indicates a recess of the depressed type in the cylinder block and having an aperture in which is mounted the nozzle 188— see Fig. 7—and into which chamber A projects the tip 188a of the nozzle. The rear wall into which extends the nozzle is partially cylindrical and this is indicated by A1 in Fig. 8. The sides thereof merge into the straight side walls A2. The floor of the chamber A is indicated by A3. The chamber A communicates with the cylinder chamber 110 by means of the passages B formed in the head.

In the present form of the invention these passages form an island C and the wall of the chamber A formed by this island C is indicated by C1 in Fig. 8 and is of partial circular form for swiveling. Each passage B is tapered downwardly as indicated at B2 in Fig. 7. The result of this multiple chamber construction is that there is created a certain turbulence which is the direction shown by the several arrows in Figs. 7 and 8. This is in addition to the turbulence previously mentioned and described with reference to the supplementary discharge of compressed air from the chamber 175 through the restricted passage 100. Figs. 6, 7 and 8, therefore, represent one convenient form of the chamber arrangement.

As shown clearly in these figures, it will be noted that the air and fuel discharged upwardly and to the right in chamber A by reason of fuel injection, impinges on the curved wall C1 and the same is deflected to the right and left, respectively, prior to escaping laterally and to the right through the passages B. That which escapes through the passages B, as shown clearly in Fig. 7, is deflected downwardly onto the adjacent power piston and across the cylinder into the remote corner thereof.

It will be noted also between the head 125 and the block of the engine and beneath the island, there is no gasket, leaving a space C2. This provides a relatively thin but wide restricted passage from chamber A to the cylinder and between the main passages B. This insures discharge directly across the top of the cylinder and that insures distribution of the combustible mixture toward the upper right hand portion of the cylinder, as shown by the topmost arrow in that cylinder in Fig. 7. This eliminates the possibility of a "dead spot" in the top of the cylinder.

While the supplementary island arrangement is shown herein associated with the diverging channel disclosure, it is to be understood the supplementary island arrangement may be incorporated in the so-called parallel channel form of the invention without departing from this disclosure.

Reference now will be had to Figs. 18 and 19, and in said figures numerals of the 600 series to a considerable extent indicate like or equivalent parts, although all of said 600 numerals, similar to previous numerals of other series, primary or otherwise, do not indicate like or similar parts.

In Fig. 9 there is illustrated the air supply conduit 646, the selective valve operating arm 653 mounted on a rock shaft 654 actuated by lever 655. The rod member 656 which actuates said lever is comparable to the lever 56 diagrammatically indicated in Fig. 4. This member 656 terminates in a yoke 656a which is pinned as at 657 to one end of a lever 658 pivoted at 659 and extending through an opening 660 in a housing 661. The shaft 626 is a shaft driven by the worm wheel 625 and coaxial therewith. The worm 625 is rotatable by the worm wheel 638 mounted on shaft 639 actuated by the hand wheel 640. Reference is had to Figs. 3 and 4 wherein the hand wheel 40, the worm supporting shaft 39 and the worm 38 are illustrated. These correspond to the 600 series designated parts last mentioned herein.

The shaft 626 mounts a bevel gear 665 that meshes with a bevel gear 666 and the latter is rigid with the rotary member 624 previously illustrated in diagrammatic manner in Figs. 3 and 4, and indicated by the numeral 24 therein. The eccentric carried thereby is indicated by the numeral 623 herein. The ratio between the bevel pinion and the bevel gear 665 and 666, respectively, is one to two, and the parts are shown in Fig. 9 in the gasoline supplying position and in this position the valve, not shown but operated by the lever 653, is seated so as to close the conduit 647.

When the hand wheel 640 is actuated, the worm 638 rotates the shaft 626. The shaft rotates counterclockwise as shown in Fig. 10, in changing over from the gasoline to the Diesel operation. The shaft 626 has a flat portion 627. The same is arranged to cooperate with the hook portion 667 of the lever 658, and in this rotation, due to manual operation of the hand wheel 640, the lever 658 is gradually moved counterclockwise, pulling down upon the rod 656 and this converts the air supply arrangement from gasoline to Diesel operation condition at the predetermined interval and almost instantaneously.

Operation of the hand wheel 640, as previously described with reference to the hand wheel 40 shown in Figs. 3 and 4, changes the compression ratio and this change is gradually rather than of an abrupt character, and is proportional to the compression ratio change effected. When the hand wheel 640 is reversely rotated, however, a different condition occurs. At the proper interval when the parts are associated together the hook 667 drops into the notch or slot 627 with almost instantaneous action so that the conversion from Diesel to gasoline operation is relatively instantaneous.

Mounted on the rod 656 is a stop 680 which is rigidly secured in adjusted position by the lock nut 681. A lever 682 carried by shaft 683 has a yoke portion 684 that straddles the rod 656 and bears on the stop or nut 680 and is constrained toward said contact by the spring 685 carried by the rod 656.

Another lever 686 is carried by the shaft 683 and is connected to a link 687 and in turn has a universal joint type connection and also of slidable character as at 688 with a lever 635 pivotally supported as at 689. This lever at its lower end is bifurcated and straddles the shaft portion 672a. The lever is adapted to engage the abutment or collar 634 on said shaft and is arranged to move the same toward the left. The parts are herein shown in the gasoline engine operating condition and, therefore, the shaft 672, governor operable, is illustrated with its abutment 673 spaced from the end of the shaft 672a and a portion of shaft 662 is shown in contact with the abutments 673a of the shaft 673.

When the engine is changed from gasoline to Diesel operation, the air valve arrangement is actuated to make the change and simultaneously therewith, the lever 635 is moved counterclockwise and to the right—see Fig. 10—and the shafts 662 and 672a are moved to the right into engagement with the collar portion 673 on the shaft 672. Thus, the bypass valve hereinbefore designated broadly as the governor control bypass arrangement is conditioned for cutoff so there is no bypassing. Therefore, continued operation of the injector will insure fuel supply for Diesel operation, subject, however, to fuel control regulation responsive to engine speed through the governor, as previously described and which briefly is, the amount of bypassing determines the amount of fuel supplied.

Reference now will be had to Figs. 11 to 14, inclusive, wherein there is illustrated the means for simultaneously varying the time of injection under Diesel operation in proportion to the compression ratio change effected by manual control. Numerals of the 700 series comparable to numerals employed in Figs. 9 and 10 of the 600 series indicate like or equivalent parts herein.

Figs. 11 to 14 disclose the preferred form of control for varying the time of injection and it is to be understood that the shaft 551 is automatically operable as illustrated in these last mentioned figures.

In these figures the numeral 739 is the hand operated shaft that operates the worm that changes the compression ratio. Herein the eccentric 723 carried by member 724 is—see Fig. 12—comparable to the same parts indicated in Fig. 1 by numerals of the primary series. This member 724 is coaxial with the bevel gear 766 driven by the bevel pinion 765 carried by shaft 726, these parts being similar to the same parts designated by numerals of the 600 series and illustrated in Figs. 9 and 10. The shaft designated by the letter B herein and common to all cylinders and constituting the support for all of the eccentric carrying members is elongated as at B' and mounts a sprocket 700. It will be remembered that the ratio is two to one between the bevel gear and its pinion.

A sprocket gear 701 is mounted on a shaft 702 and the ratio of sprocket gear 701 to sprocket gear 700 is one to two so that shaft 702 rotates at the same speed as shaft 726. Mounted on the shaft 702 is a sprocket gear 704 which through a chain 705 operates a gear 706 carried by shaft 751. The injector is indicated by the numeral 786 and the plunger 785 thereof is actuated by the cam 784 on the cam shaft 783.

Reference now will be had more particularly to Figs. 13 and 14 and from these figures it will be observed that the sprocket 704 is not directly secured to the shaft 702 but is coaxial therewith. A clutch construction is interposed therebetween and the character of the same will be set forth.

The sprocket gear 704 includes a hub portion 708 which is rotatably mounted on the enlarged portion 702a of the shaft 702. The shaft 702 also includes the peripherally enlarged or plate portion 709 and the same is nested within the chamber 710 formed in one side of the sprocket gear 704. This plate carries a pin 711 which rides in a reduced annular portion 712 formed in the sprocket gear and between the sprocket portion and the hub portion 708 thereof.

Rotatably mounted in this reduced annular channel and upon the hub portion 712 is a ring 713, the same being retained therein by the plate portion 709. This ring has a segmental peripheral projecting portion 714 and the same supports a pin 715 which rides in an arcuate groove 716 in the sprocket. Connecting the collar portion 708 and the sprocket portion 704 is the tongue 716. Secured to the hub portion 708 and to the sprocket portion 704 and to the same opposite the channel 710, is the portion 717. Portion 717 supports a pin or anchor member 718 to which is secured one end of a spring 719, the purpose of which will be set forth.

When shaft B in Fig. 11 completes one-half a revolution, shaft 702 completes an entire revolution. When the parts are shown positioned as in Fig. 22 the pin 715 engages the wall 716a of the portion 716 and thus unitizes the same, as it were. Similarly when the pin 711 engages the wall 714a of the abutment or projection 714, the ring is unitized relative to the plate and, therefore, at that time sprocket 704 will be directly coupled to the shaft 726 or in other words, shaft 739 and providing the rotation of shaft 702 is counterclockwise. This corresponds to an extremely low compression ratio as Diesel or gasoline operation. The spring 719 is at this time extended and, therefore, shaft 751 is at its extreme retarding injection position. Channel 710 and groove 716 communicate as shown in the lower portion of Fig. 14.

As the shaft 702 is reversely rotated due to the spring 719, all the parts travel together until such time as the full advanced position for time of injection is obtained, subject, however, to the limitation that all the force of the spring 719 is exhausted. This occurs at any predetermined point for which the tension of the spring is adjusted and that is adjusted by the use of a selected size of spring, et cetera, having due regard for the engine operation when operating as a Diesel.

As the time of injection is advanced in accordance with the change in compression ratio to the aforesaid predetermined position, this action is automatic. When the parts reach the predetermined position, then further advancing is obtained manually thru the shaft designated 754. It will be apparent that if there is an automatic change, the lost motion provided by the pin and slots, there being in effect two of these relationships, the same is ineffective on the control of the time of injection.

In Figs. 11 to 14 inclusive, the shaft 754 is directly coupled to shaft 751 but there is superimposed in this connection the automatic control shown more specifically in Figs. 11 and 12. It will be readily noted that in the event the invention has been operating as a Diesel engine and by reducing the compression ratio and changing to gasoline operation, the time of injection automatically will be retarded to the latest instance.

From the foregoing, therefore, it will be apparent the disclosures found in Figs. 3 and 4 taken together, constitute a composite disclosure of a multi-cylinder engine embodying the basic features of the invention and that the other views are merely supplemental thereto for illustrating various modified forms of certain portions of the broad invention disclosed herein in the three figures specifically mentioned.

As shown in Figs. 1, 2, 3, 4 and 5, the valve stem 71 and 171 is of piston character to prevent leakage in either direction although chiefly to prevent compression leakage.

If it is assumed that the parts are so constructed and operatively associated together that the conversion other than compression change occurs, substantially within a very small range (to-wit, what may be termed instantaneous) then if such is arranged to occur near the end of the Diesel conversion to gasoline operation, compression change, it will be obvious that the engine has comparatively little compression ratio change in the gasoline range of operation, but has material possibility of variation from maximum Diesel compression ratio to maximum gasoline compression and will operate only as a Diesel during this range.

For example, see Figs. 9 and 10, the Diesel operation period is the cylindrical portion of member 626 and the change-over is relatively instantaneous, as stated, and the actual movement of rod 656 is only about ⅜" so that referring to Fig. 9 the valve 244 is held seated until this full ⅜" movement has been exhausted.

Furthermore, it is to be understood that if the timing is such, member 626 can actuate valve 244-245 to convert prior to eccentric 23—see Figs. 3 and 4—attaining the position shown in Fig. 3.

Under these circumstances, the remainder of the eccentric movement is available for compression ratio variation under gasoline operation.

It is to be observed that the Diesel fuel pump operates as long as the engine operates, although a bypassing is effected during gasoline operation. To start cold, the engine operates as a gasoline engine. When desired, at any time thereafter that the engine is capable of operating as a Diesel engine, the transformation is effected. Should there be air trapped in the Diesel fuel supply, the momentum of the engine flywheel (not shown) together with other parts and their tendency to continue functioning causes the Diesel fuel pump to first discharge or eject the trapped or locking air and then to discharge fuel. This is because the supply of fuel to the fuel pump is at the lower end thereof, so the air is first discharged from the pump and then the fuel follows.

The resulting engine therefor, is more than a gasoline started Diesel for the gas phase of operation is a true power or load phase and not an incidental low load or starting phase. Therefore, operation as a gasoline engine under load imposes no undue strain or stress upon the engine and the resultant convertible structure as hereinbefore pointed out has the several advantages of each type of engine and be selectively operated as such and has substantially none of the disadvantages of so-called convertible engines or engines arranged solely for starting or light purposes under one phase and normal or heavy operation under the other phase.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a convertible gasoline-Diesel engine, the combination of a cylinder, a piston therein, a crank shaft, means connecting the piston to the throw portion of the shaft, adjustable means operatively associated with the aforementioned means for varying piston travel for compression ratio change, and means for retaining said adjustment whereby for any given adjustment for piston travel, the travel is the same during further operation under such adjustment, a gasoline fuel arrangement, a Diesel fuel supply arrangement, and means coordinated with the second mentioned means selectively operating one of the arrangements for a selected engine type of operation, said third mentioned means and said second mentioned means including mechanism variable at will during Diesel operation for adjusting the compression ratio, and said Diesel fuel supply arrangement having cooperative coordination with said third mentioned means for automatically varying the Diesel fuel supply.

2. In a convertible gasoline-Diesel engine, the combination of a cylinder, a piston therein, a crank shaft, means connecting the piston to the throw portion of the shaft, adjustable means operatively associated with the aforementioned means for varying piston travel for compression ratio change, and means for retaining said adjustment whereby for any given adjustment for piston travel, the travel is the same during further operation under such adjustment, a gasoline fuel arrangement, a Diesel fuel supply arrangement, and means coordinated with the second mentioned means selectively operating one of the arrangements for a selected engine type of operation, said third mentioned means and said second mentioned means including mechanism variable at will during Diesel operation for adjusting the compression ratio, and said Diesel fuel supply arrangement having cooperative coordination with said third mentioned means for automatically varying the Diesel fuel supply for retarding the injection in proportion to the lowering of the compression ratio.

3. In a convertible gasoline-Diesel engine, the combination of a cylinder, a piston therein, a crank shaft, means connecting the piston to the throw portion of the shaft, means operatively associated with the aforementioned means for varying piston travel for compression ratio change, a gasoline fuel arrangement, a Diesel fuel supply arrangement, and means coordinated with the second mentioned means selectively operating one of the arrangements for a selected engine type of operation, said third mentioned means and said second mentioned means including mechanism variable at will during Diesel operation for adjusting the compression ratio, and said Diesel fuel supply arrangement having cooperative coordination with said third mentioned means for automatically varying the Diesel fuel supply for diminishing the fuel supply in proportion to the reduction in the compression ratio.

4. In a convertible gasoline-Diesel engine, the combination of a cylinder, a piston therein, a crank shaft, means connecting the piston to the throw portion of the shaft, means operatively associated with the aforementioned means for varying piston travel for compression ratio change, a gasoline fuel arrangement, a Diesel fuel supply arrangement, means coordinated with the second mentioned means selectively operating one of the arrangements for a selected engine type of operation, and means operatively connected to the second mentioned means and the gasoline fuel arrangement for automatically varying the fuel supply therefrom in accordance with gasoline operation compression variation.

5. In a convertible gasoline-Diesel engine, the combination with a power cylinder structure, a chamber in juxtaposition thereto, a passage therebetween, a gasoline fuel supply port in the cylinder structure, an intake valve therefor, a valve between the chamber and cylinder structure, ignition means in the chamber, a Diesel fuel supply discharging to the passage, a restricted communication between the chamber and passage and bypassing the last mentioned valve, means for operating the engine as a Diesel engine, means for operating the engine as a gasoline engine, and means selectively controlling the type of engine operation means and said last mentioned valve.

6. In a convertible gasoline-Diesel engine, the combination with a power cylinder structure, a chamber in juxtaposition thereto, a passage therebetween, a gasoline fuel supply port in the cylinder structure, an intake valve therefor, a valve between the chamber and cylinder structure, ignition means in the chamber, a Diesel fuel supply discharging to the passage, a restricted communication between the chamber and passage and bypassing the last mentioned valve for the purpose described, said communication at the passage end having directional discharge adjacent the Diesel fuel supply discharge but other than in longitudinal alignment therewith to insure non-clogging of the communication and Diesel discharge cleaning, and means controlling the type of engine operation and said last mentioned valve for the purpose described.

LAURITZ N. MILLER.